Aug. 4, 1953

T. IAVELLI 2,647,598

POWER TRANSMISSION AND CHANGE SPEED
CLUTCH MECHANISM THEREFOR

Filed Nov. 4, 1949

INVENTOR.
Teno Iavelli.
BY Harness & Harris
ATTORNEYS.

Patented Aug. 4, 1953

2,647,598

UNITED STATES PATENT OFFICE 2,647,598

POWER TRANSMISSION AND CHANGE SPEED CLUTCH MECHANISM THEREFOR

Teno Iavelli, Detroit, Mich., assignor to Chrysler Corporation, Highland Park, Mich., a corporation of Delaware Application November 4, 1949, Serial No. 125,574

8 Claims. (Cl. 192—48)

This invention relates to variable speed power transmissions for automotive application and to the change speed clutch mechanism therefor.

More particularly the invention relates to improvements in blocker ring type of centrifugal pawl clutches and in the structure for energizing the blocker ring thereof and is especially concerned with such improvements as applied to clutch mechanism having in drive series a blocker ring type of centrifugal pawl clutch and a toothed blocker ring type of interengageable multi-tooth clutch and which improvements are intended to better facilitate a synchronized shift of the multi-tooth clutch and to prevent tooth damage as when starting the vehicle from rest with a high idle engine and without disengagement of the master clutch.

Mechanism of the latter character is shown and described in the application of Bucy et al., Serial No. 16,214, filed March 22, 1948. According to that disclosure, engine drive of the toothed blocker ring is obtained through a chain of structure including a conical frictional drive between the pawl blocker and pawl receiving shell, and a second conical friction drive between the shell and the toothed blocker ring, one or more flat finger type springs being utilized for facilitating the friction drives.

Although this arrangement has given satisfactory results in most cases, the use of exceptionally strong finger springs to effect the frictional drive has been found desirable and these even when made of steel could not always be relied upon to operate for extended periods without fatigue or to provide a uniform distribution of pressure. Moreover, when separate finger springs were used for each blocker, that for the centrifugal clutch pawl blocker was located between this blocker and the pawl carrier and the heavy pressure of this spring against the blocker tended to cock the latter and cause jamming at the conical friction surfaces. Moreover, the springs were located where they were subject to the action of relatively rotating surfaces and this adversely affected them. I have discovered that if the energizing pressure for the pawl blocker is transmitted to it through the pawl shell, cocking and jamming is avoided since the blocker obtains a solid backing against the pawl carrier. Moreover, the use of coil compression springs makes available the requisite degree of pressure without fatigue and the spring structure may be arranged to avoid the action of relatively rotating surfaces.

An object of this invention is therefore, to provide a simple and effective structure for driving the toothed blocker ring of a multi-tooth clutch in a transmission arrangement providing a centrifugal pawl clutch drivingly ahead of the multi-tooth clutch.

Another object is to provide a simple and effective structure for establishing frictional drive between the pawl blocker and pawl receiving shell of a centrifugal pawl clutch, which drive is not susceptible to jamming or cocking of the working parts.

Still another object is to provide a coil compression spring arrangement for imparting uniform circumferential thrust between the pawl blocker and pawl receiving shell of a centrifugal pawl clutch sufficient to impart and maintain a frictional drive between these elements, and wherein the springs are not subject to fatigue or the action of relatively moving surfaces.

These and other objects of my invention will become more apparent from the following description when taken in conjunction with the accompanying drawing wherein.

Figure 1:
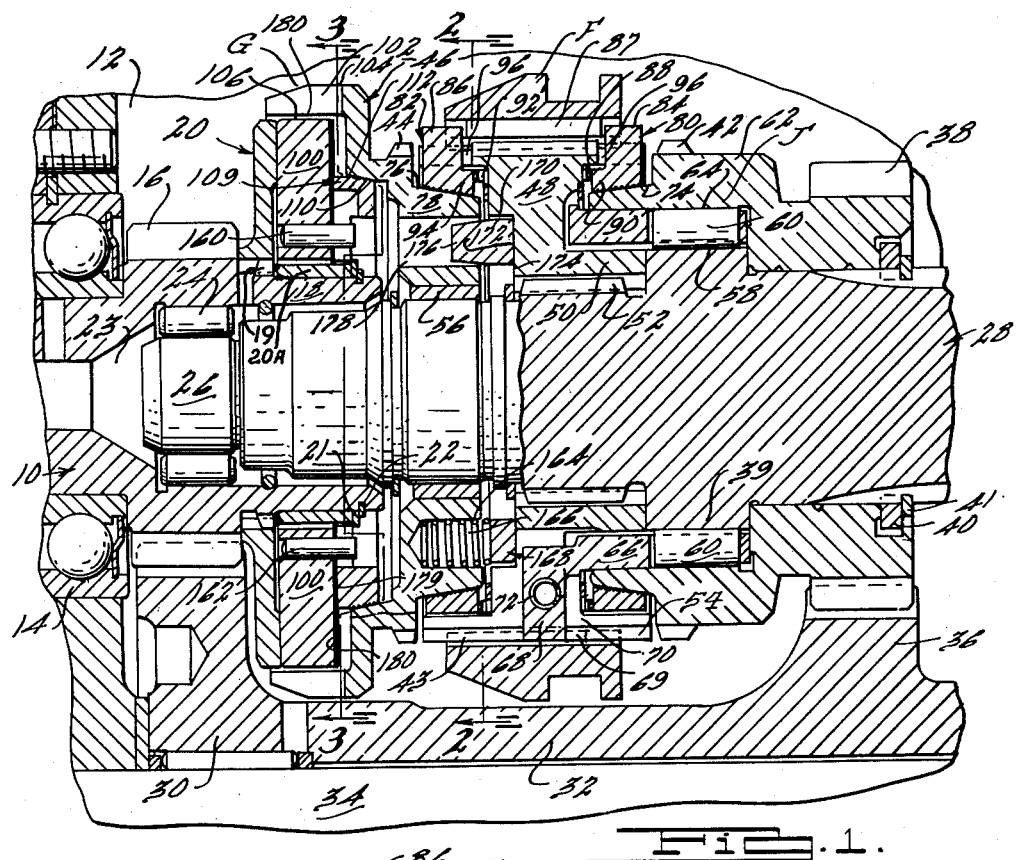
Figure 1 is a longitudinal sectional elevation view of the clutch mechanism of my invention.

Referring to the drawing wherein similar reference characters are used to designate corresponding parts of the structure, Figure 1 shows my invention as applied to a change speed transmission such as shown and described in the said copending application of Bucy et al., and reference is hereby made to said copending application for any structure or controls referred to in the subject description but not shown in the drawing.

As seen in Figure 1 a drive shaft 10 extends rearwardly into a housing or casing 12 of the transmission where it is rotatably supported by a ball bearing 14 and is formed with a main drive pinion 16 adjacent its inner end. Formed on the rearward end of the shaft 10 adjacent the pinion 16 is an annular extension 18 on which is carried and to which is splined as at 19 a pawl carrying member 20 of a centrifugal type pawl clutch generally designated by the letter G. The member 20 is also carried by a sleeve 20A which together with a washer 21 and snap ring 22 holds this member in position on the shaft 10. The annular extension 18 of the shaft 10 provides a bore 23 which journals, by a bearing 24, the forward end 26 of a driven shaft 28.

The drive pinion 16 is arranged in constant mesh with a gear 30 forming part of a countershaft cluster gear 32, which is carried for rotation on a countershaft 34 supported in the casing 12. The cluster includes a second or intermediate speed ratio drive pinion 36 which is arranged to be in constant mesh with the second speed gear 38 rotatably journalled on the shaft 28 between the shaft 28, enlargement 39 and a washer 40 held endwise by a snap ring 41.

The gear 38 has a set of integral external clutch or drive control teeth 42, adapted for interengagement with a set of internal clutch or drive control teeth 43 of a manually shiftable clutch sleeve or member generally designated by the letter F, which is adapted to be shifted rearwardly, axially of the shaft 28 from its neutral position shown in Figure 1, to engage the clutch teeth 42 or alternatively to be shifted forwardly to engage a set of integral external clutch or drive control teeth 44 of a floating centrifugal clutch pawl receiving shell generally designated by the numeral 46. The sleeve F is movable by a suitable yoke member, not shown.

The clutch sleeve F is slidably carried on a hub generally designated by the numeral 48. The hub 48 has a rearwardly extending annular portion 50 splined as at 52 to the shaft 28. The hub 48 is provided with external splines or teeth 54 spaced circumferentially to provide recesses or splineways to receive the internal teeth 43 of the sleeve F.

The shaft 28 is preferably provided with an annular bearing sleeve 56 on which the centrifugal clutch shell 46 is rotatably journalled and axially movable. Moreover, the enlargement 39 of the shaft 28 rearwardly of the hub 48 is preferably formed with circumferentially spaced external cam faces 58 providing an inner race to engage the rolls 60 of an overrunning roller clutch generally designated by the letter J. The gear 38 has a forwardly extending annular portion 62 which carries the clutch teeth 42 and is provided with a smooth internal annular face 64 which serves as the outer race or runway for the rollers 60 of the clutch J. The rollers 60 are carried in a cage 66 which has radially outwardly extending projections or tabs 68, one being shown, received in longitudinal slots 70 formed in the periphery of the hub 48. These projections or tabs 68 are engageable with certain camming teeth 69 of the clutch sleeve F as more specifically described in said Bucy et al. application for controlling the cage 66 such that the roller clutch is operative to transmit power only when the sleeve F is in its forward position engaged with the clutch teeth 44. Compression springs 72 are seated in recesses of the tabs 68 and bear against the tabs and side walls of the hub slots to bias the rollers 60 in a direction to move them into a locked-up driving position between the cams 58 of the shaft 28 and the outer race 64 of the gear 38 to establish a one-way drive from the gear 38 to the shaft 28 when, as previously stated, the clutch sleeve F is in its forward position engaged with the teeth 44 and there is a tendency of the gear 38 to rotate faster than the shaft 28 in a forward direction. Upon any tendency of the gear 38 to slow down below the speed of the shaft 28 the clutch J will permit overrunning of the shaft 28 with respect to the gear 38. In the neutral position of the sleeve F shown in Figure 1 no drive is possible in either direction through the clutch J. In the rearward or two-way second speed position of the sleeve F the control cage 66 is still maintained by the sleeve F in a position to prevent drive through this overrunning device.

The gear 38 is provided at the forward end of its extension 62 with a cone-shaped or frusto-conical surface 74. A similar surface 76 is provided at the rearward end or annular portion 78 of the pawl shell 46. Journalled on each of the surfaces 74, 76 are blocker or balking rings 80 and 82 respectively, provided with pointed or keystone-shaped blocker synchronizing teeth 84, 86 alignable with slots 87 of the clutch sleeve F.

Ring 80 is urged into frictional drive connection with the surface 74 of the gear 38 by a finger spring 88 positioned between the hub 48 and the hub portion 90 of the ring 80. A similar spring 92 is located between the hub 48 and the hub 94 of the ring 82. The teeth 84, 86 of the rings 80 and 82 respectively, are also engaged in slots 96 of the hub 48 which provide a limited relative rotation of these rings relative to the hub 48 and hence also with respect to the sleeve F such that when the relative speeds of the sleeve F and gear 38 are asynchronous the teeth 84 of the ring 80 will tend to block rearward shift of the sleeve F until the speeds of the clutch sleeve F and the gear 38 become synchronous.

The teeth 86 of the ring 82 similarly serve to block forward shift of the clutch sleeve F when the sleeve F and the shell 46 are rotating asynchronously.

The centrifugal pawl clutch G comprises a pawl carrier 20 driven by the shaft 10, a plurality of pawls, two being shown, each generally designated by the numeral 100, and a floating pawl receiving shell member 46 which, as previously stated, may be drivingly connected to the shaft 28 by shifting the clutch sleeve F forwardly to its overrunning second drive position into engagement with the clutch teeth 44 of the shell. When thus engaged the clutch sleeve F releases the roller cage 66 of the roller clutch J to permit drive of the shaft 28 through the rollers 60 by the gear 38.

The pawls 100 are adapted for outward movement oppositely to one another in response to centrifugal force occasioned by rotation of the carrier 20 to engage slots or windows 102 provided in the annular portion 104 of the floating shell 46 to establish a two-way direct drive between the shafts 10 and 28 when the sleeve F is clutched with the teeth 44 of the shell 46. Preferably a plurality of pawl receiving windows 102 are provided, which number is also preferably a multiple of the number of pawls, eight windows being here shown.

Each pawl 100 has a clutching head portion 106 for engagement with the windows 102 and a tail portion 107, which acts as a guide for the head of the opposite pawl. Moreover, the pawls are maintained in their disengaged position below a predetermined speed of rotation of the carrier 20 by a normal retracting bias applied by control or governor springs 108, which oppose the centrifugal tendencies of the pawls in the speed range where disengagement of the pawls is desired. The clutch G is also provided with a member or ring generally designated by the numeral 109 having a double function, first that of serving as a blocker or balk ring for preventing engagement of the pawls with the windows 102 of the shell member 46 until the rotative speeds of the pawls and shell are synchronous, and secondly of providing a drive connection for the shell 46 and blocker member 82 to inhibit establishment of a drive from the engine through the overrunning clutch J when the vehicle is at a standstill with the engine operating in high idle speed and forward shift of the sleeve F is either accidentally or deliberately attempted without first releasing the master clutch.

Figure 3:
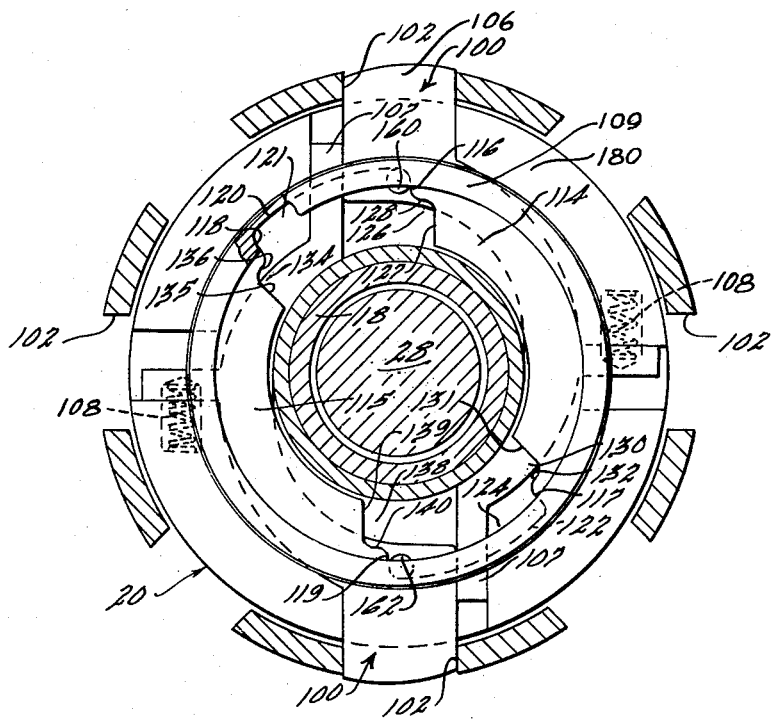
Figure 3 is a transverse sectional view taken at 3—3 in Figure 1.

The member 109 is in the form of a frusto-conical ring, the outer surface of which is cut with a continuous oil groove formed by a fine pitch thread and arranged to frictionally contact a smooth complementary internal conical surface 112 provided on the annular forwardly projecting portion 104 of the clutch shell 46 just rearwardly of the windows 102. The ring 109 is circumferentially recessed at its inner periphery, as seen in Figure 3 at 121 and 124, to provide a pair of diametrically opposite radially inwardly directed lugs 114, 115 which are stepped to form inner and wider outer lug portions. The base or outer lug portion of the lug 114 has side faces 116, 117 and that of the lug 115 side faces 118, 119. The side faces 116, 118 connect with a circumferential land 120 of the recess 121 to provide a circumferential step. Similarly the side faces 117, 119 are connected by a circumferential land 122 of the recess 124 to provide a circumferential step. These lands 120, 124 are at the same radial distance from the axis of rotation. Each lug has a further pair of steps. Thus lug 114 has a step 126 formed by a side face 127 and a land 128, and a step 130 formed by a side face 131 and a land 132. Similarly the lug 115 has a step 134 formed by a side face 135 and a land 136 and a step 138 formed by a side face 139 and a land 140. The ring 109 may be split to provide a slight outward spring effect so as to facilitate establishment of a normal light frictional contact between the conical surfaces 110, 112.

Figure 2:
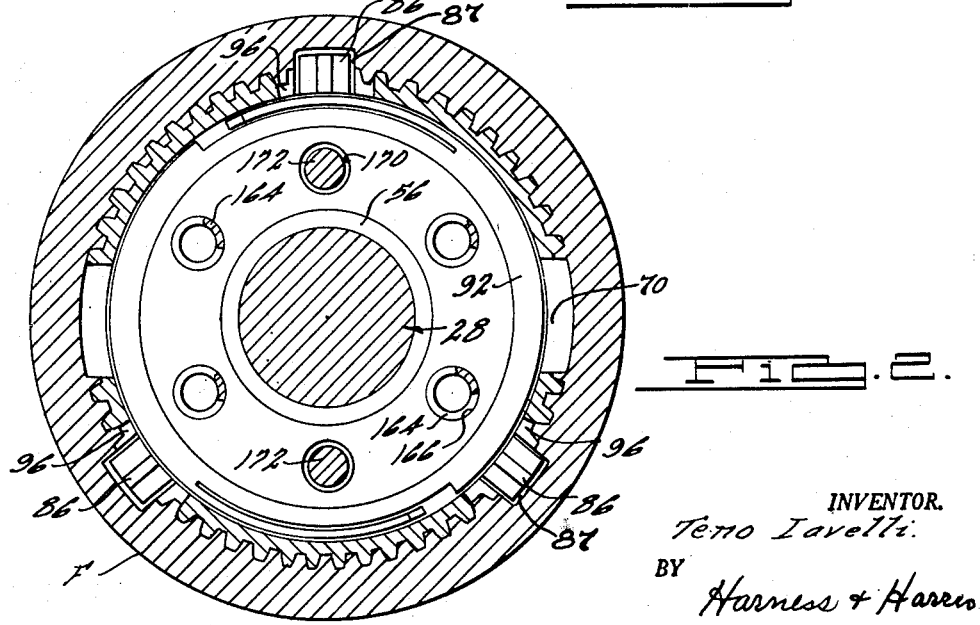
Figure 2 is a transverse sectional view taken at 2—2 in Figure 1.

A feature of the invention resides in the arrangement and combination of structure for energizing the friction drive between the shell member 46, and blocker ring 109 and in the provision of means for establishing drive of the blocker 82 from the drive shaft 10. Thus drive between the shaft 10 and the ring 109 may be effected as hereinafter described between pins 160, 162 located on the pawls 100 at the same radial distance, and rigidly fixed in the rearward side faces thereof so as to project rearwardly into the vertical plane of the ring 109 with which they are adapted to become drivingly engaged. Drive between the ring 109 and the shell 46 is accomplished through the friction connection at the conical surfaces 110, 112, this friction connection being energized by a plurality, four being shown, of coil compression springs 164, which as seen in Figures 1 and 2, are carried in lateral recesses or bores 166 in the shell 46 and have their rearward ends bear against a ring 168 which is seated in a recess 170 of the hub 48 and has its rearward surface 172 in contact with the thrust taking and bearing surface 174 of this recess of the hub 48 with which it may have relative rotation.

In order to prevent any side buckling of the springs 164 such as might be caused by relative motion between the shell member 46 and a surface against which the rearward ends of the springs are in contact, the ring 168 is by preference provided with forwardly projecting protuberances or post-like members 176, two being shown, which are operably engaged in recesses 178 of the shell 46 to thus prevent relative rotation between the ring 168 and the shell 46. The projections 176 of the ring 168 have a slight outwardly converging taper to facilitate assembly with the recesses 178 of the shell 46.

It will be observed that the springs 164 exert a forward bias against the shell 46, which is transmitted to the contacting conical surfaces 110, 112, the pressure exerted between these surfaces being sufficiently strong to permit drive of the shell 46 by the blocker ring 109 when drive is effected between the carrier 18 and the ring 109 through the pawl pins 160, 162. The above described construction makes it possible to obtain pressure contact between the surfaces 110, 112 of any desirable value without danger of fatigue. It also effects an even distribution of the lateral bias and inhibits cocking or jamming of the shell 46 or blocker ring 109 during operation, whether energized by the springs 164 alone or as amplified by forward movement of the sleeve F when effecting engagement with the teeth 44, it being noted in this connection that the blocker ring 109 receives a solid backing by engagement of its forward end face 179 with the face 180 of the carrier 18. Manifestly, the spring 92 applies a forward bias to the tooth blocker 82 to effect a drive engagement between this member and the shell 46 such that when the shell member is driven from the carrier it also, by reason of this latter frictional drive engagement, effects a drive of the blocker 82.

During asynchronous rotation of the pawls and shell, the pins 160, 162 respectively, lie in the path of the faces 127, 135 and 131, 139 respectively, of the inner portions of the lugs. When the pawls are engaged, the pins 160, 162 respectively, are positioned or received in the recesses formed by the lands 120, 122 respectively. The lands 120—122 may, if desired, function as outer limit stops for the pins 160, 162 respectively, to limit the outward movement of the pawls. It will be observed that the lands 120, 122 extend over an arc of greater circumferential extent than the circumferential distances between similar points on any two pawl windows plus the pin diameters measured on the same arc as these lands. This permits the pawls to readily engage the nearest window under all relative positions of the pawls and windows.

When the centrifugal pawls 100 are below their engaging speed, the pins 160, 162 will be engaged with one or the other of the inner portions of the lugs 114, 115 depending upon the operating conditions prevailing in the transmission, and will prevent engagement of the pawls with the shell 46 even when the pawls reach their engaging speed until such time as the pins becomes disengaged from these inner portions of the lugs.

When the clutch sleeve F is positioned in neutral and the vehicle is at a standstill with the engine idling, the pins 160, 162 will be engaged with the said faces 135, 131 respectively of the lugs 115, 114 so as to rotatably drive the blocker member or ring 109 in the direction of rotation of the pinion 16. Engagement of the pawls at this time will be prevented by the faces 136, 132 of the lugs which will also prevent ratcheting of the pawls, clearance being maintained at this time between the outer or head ends 106 of the pawls and the inner annular surface 180 of the shell 46. Due to the energized friction connection between the blocker ring 109 and the shell 46 and the friction connection between the blocker ring 82 and the shell 46, these parts will also tend to rotate with the ring 109. The teeth 86 of the blocker ring 82 will, therefore, be rotated to the limit of the lost motion connection provided between the teeth 86 and the slots 96 in the hub 48 so as to be brought into blocking relationship with the teeth 54 of the sleeve F.

If the master clutch of the vehicle be disengaged by depressing the clutch pedal and the clutch sleeve F be moved forwardly to establish second speed drive ratio through the overrunning clutch J engagement between the teeth of the sleeve F and blocking ring 82 will transmit increased pressure at the conical surface 76 of the shell 46 and conical surface 110 of the ring 109 to bring the shell 46 to a standstill (the sleeve F being at this time stationary) and the teeth 43 of the sleeve F will thereupon pass between the teeth 86 of the blocker ring 82 and into engagement with the teeth 44 of the shell 46. During this movement of the sleeve F into engagement with the teeth 44, the projection 68 of the overrunning clutch J will be permitted to be urged by the spring 72 into clutch lockup position whereby drive may be transmitted from the gear 38 through the overrunning clutch J to the shaft 28. By reason of the engagement between the clutch sleeve F and the teeth 44, drive will also be impressed upon the shell 46 through the hub 48, sleeve F, and teeth 44.

Should for some reason the driver deliberately or accidentally shift the sleeve forwardly under the aforesaid conditions without, however, having released the master clutch, it would be impossible to synchronize the shell member 46 with the sleeve F to permit engagement between the teeth 43 of the sleeve and the teeth 44 of the shell member 46 because increased pressure between the blocker ring 82 and the shell 46 will also be imparted to the friction connection 110, 112 between the shell member 46 and the pawl blocker ring 109 since the ring 109 is in drive relationship with the pinion 16 at this time. Hence asynchronous conditions will be maintained and engagement of the sleeve F with the teeth 44, and of the overrunning clutch J will be prevented, thereby avoiding tooth breakage or other damage, especially should the engine be operating at this time under a high idle condition. It is to be noted that the length of the shell slots or windows 192 parallel to the axis of rotation of the clutch G is sufficient to allow for a substantial forward axial movement of the shell 46 without interfering with the pawls 160, 162. The construction provides for some permissible forward movement of the shell member 46 when pressure is applied between the hub and the shell by the springs 164.

Engagement of the sleeve F with the teeth 44 will also be prevented if a shift from two-way second speed ratio position is attempted while the vehicle is undergoing drive if the master clutch is not maintained released at the time the sleeve F passes through the neutral position.

Assuming that the clutch sleeve F has been shifted forwardly into engagement with the teeth 44 and the master clutch has been engaged, drive will be established as previously indicated, in overrunning second speed ratio drive. At this time the pawls 100 will be rotating faster than the shell member 46 which is then being driven by the clutch sleeve F, and the pins 160, 162 of the pawls will drive the blocker ring 109 at the speed of the pinion 16, the ring 109 slipping relative to the shell member 46. As the vehicle is accelerated in this overrunning second speed ratio drive, centrifugal force will tend to move the pawls 100 outwardly against the retracting effect of their governor springs 108 but they will be prevented from engaging the shell by the lands 132 and 136 of the ring 109. Once the speed of the vehicle is at or above the engaging speed of the pawls 100, action upon the part of the driver to relax pressure on the accelerator pedal to move the throttle in a closing direction will cause the engine to decelerate and slow down rotation of the pawl carrier 18. When the speed of the carrier 18 becomes synchronized with the speed of the shell member 46, or stated otherwise, when the speeds of the pawl carrier 18 and shell member 46 cross each other the ring 109 will no longer be driven by the pawls but will be driven by the shell member 46 through its friction connection therewith and relative motion will take place between the ring 109 and the pawl pins 160, 162 allowing the pins 160, 162 to slide off the lands 136, 132 respectively and into the recesses 121, 124 respectively provided by the lands 120, 122 of the ring 109. Should the pawls at this moment be aligned with the shell windows 192, engagement therebetween will immediately take place to establish a two-way direct drive between the shafts 10 and 28. However, should the pawls and windows be misaligned, the pins 160, 162 will move through the recesses 121, 124 while the pawls 100 rub against the annular surface 180 of the shell until the next nearest windows of the shell become aligned with the pawls whereupon engagement will take place. It is to be noted that the lands 120, 122 are of sufficient length to permit this engagement to take place.

Once the pawls are engaged, the driver may again depress the accelerator and the vehicle will be driven in direct drive until such time as its speed drops below the engaging speed of the pawls 100 whereon the governor springs 108 of the pawls will urge the pawls to retract and such will occur immediately the driving pressure between the pawls 100 and the shell 46 is sufficiently relieved.

As soon as the pawls become disengaged, the pins 160, 162 will again assume the position in the recesses 134, 130 respectively, and drive the blocker ring 109 in the manner previously described.

Under coast torque conditions at or above the engaging speed of the pawls in overrunning second speed ratio drive, the shaft 28 will become the driver and the tendency will be for the shell 46 to drive the blocker ring 109 through its friction connection 110, 112 such that the ring 109 will now rotatably lead the pawl carrier 18.

Under these conditions the faces 127, 128 and 139, 140 of the inner portions of the lugs 114, 115 of the ring 109 will become engaged with the pins 160, 162 respectively; and the balk ring 109 will thereafter slip relative to the shell member 46. Upon speeding up of the pawl carrier 18 such that a torque reversal occurs, the relative speeds of the carrier 18 and shell member 46 will become synchronized and cross each other and the pins 160, 162 will then tend to rotatably lead the ring 109 and will slide off the lands 128, 140 and enter the recesses provided by the lands 120, 122. Thereafter the pawls will become engaged with the shell windows as soon as these elements have become aligned with each other.

From the above description it will be seen that I have provided a transmission structure providing a novel blocker energizing and drive arrangement for the clutch mechanism thereof that is believed free of jamming and cocking and that facilitates clutch engagement without clash or tooth damage.

Although the particular structure shown and described is well adapted for carrying out the objects of my invention, it will be understood that various modifications, changes, and substitutions may be made without departing from the spirit thereof. The subject invention is, therefore, to be construed to include all such modifications, changes, and substitutions as may come within the scope of the following claims.

What is claimed is:

1. In a power transmission, driving means, driven means, a freely rotatable shell member coaxial with said driving and driven means and adapted to be drivingly connected with the latter, centrifugal pawl means operable to drivingly connect said shell member and said driving means, a pawl blocker ring journalled by said shell member for frictional drive therewith and adapted for drive connection with said pawl means, and a plurality of coil compression springs operable upon said shell for energizing said friction drive between said ring and shell member, said ring being intermediate said shell member and pawl means and said pawl means taking the thrust reaction of said springs.

2. In a power transmission, driving means, driven means, a freely rotatable shell member coaxial with said driving and driven means and journalled on the latter, releasable means for drivingly connecting said shell member and driven means, centrifugal pawl means operable to drivingly connect said shell member and said driving means, a pawl blocker ring journalled by said shell member for frictional drive therewith, means for drivingly connecting said ring and pawl means, and a plurality of coil compression springs operable upon said shell for energizing said friction drive between said ring and shell member, said ring being intermediate said shell member and pawl means and said pawl means taking the thrust reaction of said springs.

3. In a power transmission, driving means, driven means, a freely rotatable shell member coaxial with said driving and driven means and adapted to be drivingly connected with the latter, centrifugal pawl means operable to drivingly connect said shell member and said driving means, a pawl blocker ring journalled by said shell member for frictional drive therewith, means for drivingly connecting said ring and pawl means, an abutment on said driven means, and a plurality of coil compression springs operable between said shell and said abutment for energizing said friction drive between said ring and shell member, said ring being intermediate said shell member and pawl means and said pawl means taking the thrust reaction of said springs.

4. In a power transmission, driving means, driven means, a freely rotatable shell member coaxial with said driving and driven means and adapted to be drivingly connected with the latter, centrifugal pawl means operable to drivingly connect said shell member and said driving means, a pawl blocker ring journalled by said shell member for frictional drive therewith, said ring having an end face arranged to abut said pawl means, means for drivingly connecting said ring and pawl means, a stop on said driven means, a spring thrust ring in abutment with said stop and drivingly connected with said shell member and a plurality of coil compression springs operable between said shell member and thrust ring for energizing said friction drive between said blocker ring and shell member.

5. In a power transmission, a drive shaft, a driven shaft, a freely rotatable shell member journalled on one of said drive and driven shafts, centrifugal pawl means operable to drivingly connect said shell member and said drive shaft, a hub member fixed to said driven shaft for rotation therewith, means for drivingly connecting said hub and shell members, a frusto-conical blocker ring journalled by said shell member for frictional drive therewith, means for drivingly connecting said blocker ring and pawl means, a spring thrust ring in abutment with said hub member and drivingly connected with said shell member, and a plurality of coil compression springs operable between said shell member and said thrust ring for energizing the drive between said blocker ring and shell member.

6. In a power transmission, a drive shaft; a driven shaft; a freely rotatable slotted shell member journalled on one of said drive and driven shafts; centrifugal pawl means operable to drivingly connect said shell member and said drive shaft, said means including a pawl carrier having an end face, and a pawl rotatable with said carrier and engageable with a slot of said shell for establishing said drive connection; a pawl blocker ring rotatable with said carrier and rotatable within limits relative thereto, said blocker ring having a conical friction face for coacting with a complementary conical friction face on said shell member for supporting said ring and to establish a friction drive therebetween when these friction faces are energized and having an end face engageable with said end face of said carrier for maintaining said ring centered relative to said shell; a spring abutment rotatable with said shell member; and a plurality of coil compression springs operable between said shell member and abutment for transmitting energizing pressure through said shell member to said coacting friction faces and as an incident thereto effect engagement of said end faces of said blocker ring and said carrier.

7. In a power transmission, a rotatable drive shaft; a rotatable driven shaft; a freely rotatable shell member journalled on said driven shaft; centrifugal pawl clutch means operable to drivingly connect said shell member and drive shaft, said centrifugal clutch means including a pawl carrier rotatable with said drive shaft and an end face on said carrier, and a pawl driven by said carrier; a hub member secured to said driven shaft for rotation therewith and having a predetermined position axially thereof, said hub member having an end thrust taking face; means carried by said hub member for drivingly connecting said hub member and shell member; a pawl blocker ring having a conical friction face coactable with a complementary friction face on said shell member for establishing a friction drive therebetween and having an end face engageable with said end face of said carrier when said ring is urged in the direction of said carrier; means on said pawl and blocker ring providing for rotation of said blocker ring with said carrier and for limited relative rotation between them; a spring backing element drivingly connected with said shell member for rotation therewith and having an end face coactable with said end thrust face of said hub member when said backing element is urged in the direction of said hub member; and a plurality of coil compression springs operably arranged between said shell member and said backing element, said springs being operable to transmit energizing pressure through said shell member to said coacting friction faces and as an incident thereto urge the said end faces of blocker ring and carrier into engagement and the said end face of said spring backing element into engagement with the thrust taking face of said hub.

8. In a power transmission, a rotatable drive shaft, a rotatable driven shaft; a freely rotatable shell member journalled on said driven shaft, said shell member having a set of clutch teeth and having a pair of conical friction faces; centrifugal pawl clutch means operable to drivingly connect said shell member and drive shaft; said centrifugal clutch members including a pawl carrier rotatable with said drive shaft, an end face on said carrier, and a pawl rotatable with said carrier; a hub member secured to said driven shaft in predetermined position for rotation therewith, said hub member having an end thrust taking face; an axially shiftable member carried by said hub member and shiftable axially into and out of engagement with the said clutch teeth of said shell; a balking ring rotatable with the shiftable member and rotatable within limits relative thereto, said balking ring having a friction face for coacting with one of said conical friction faces of said shell member; a pawl blocker ring rotatable with said carrier and rotatable within limits relative thereto, said blocker ring having a conical friction face for coacting with the other of said conical friction faces of said shell for supporting said blocker ring and establishing a friction drive connection between said blocker ring and shell member and said blocker ring having an end face engageable with said end face of said carrier when said blocker ring is urged in the direction of said carrier; a spring backing ring having an end face for coacting with said end thrust face of said hub member when said element is urged in the direction of said hub member, said ring having a pair of lateral lugs receivable in recesses in said shell member for establishing a drive connection between this element and said shell member; and a plurality of circumferentially spaced coil compression springs operably disposed between said shell member and backing ring and seated in recesses in said shell member, said springs being operable to transmit energizing pressure through said shell member to said coacting friction faces of said shell member and said blocker ring and as an incident thereto bias the said end faces of said blocker ring and carrier into engagement and the said end face of said backing element into engagement with said thrust taking face of said hub member and there being spring means for energizing the coacting friction faces of said balking ring and shell member.

TENO IAVELLI.

References Cited in the file of this patent

UNITED STATES PATENTS

| Number | Name | Date |
|---|---|---|
| 2,278,623 | Orr | Apr. 7, 1942 |
| 2,286,585 | Simpson | June 16, 1942 |
| 2,343,312 | Maurer | Mar. 7, 1944 |